Sept. 4, 1962 J. F. JONES ET AL 3,052,305
PRESSURE JET TYPE HELICOPTER
Filed March 14, 1958 9 Sheets-Sheet 2

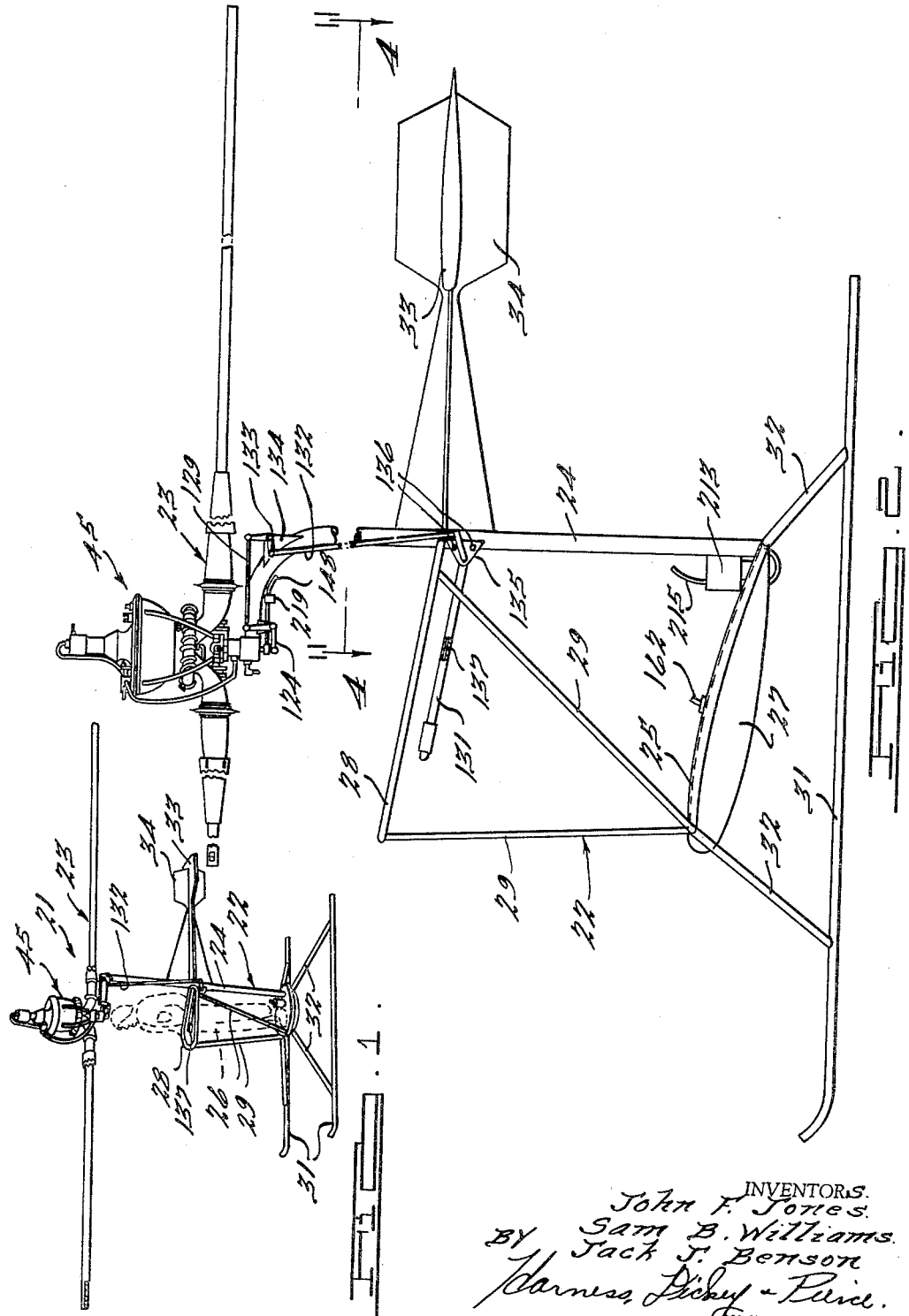

INVENTORS.
John F. Jones.
Sam B. Williams.
BY Jack J. Benson.
Harness, Dickey & Pierce.
ATTORNEYS.

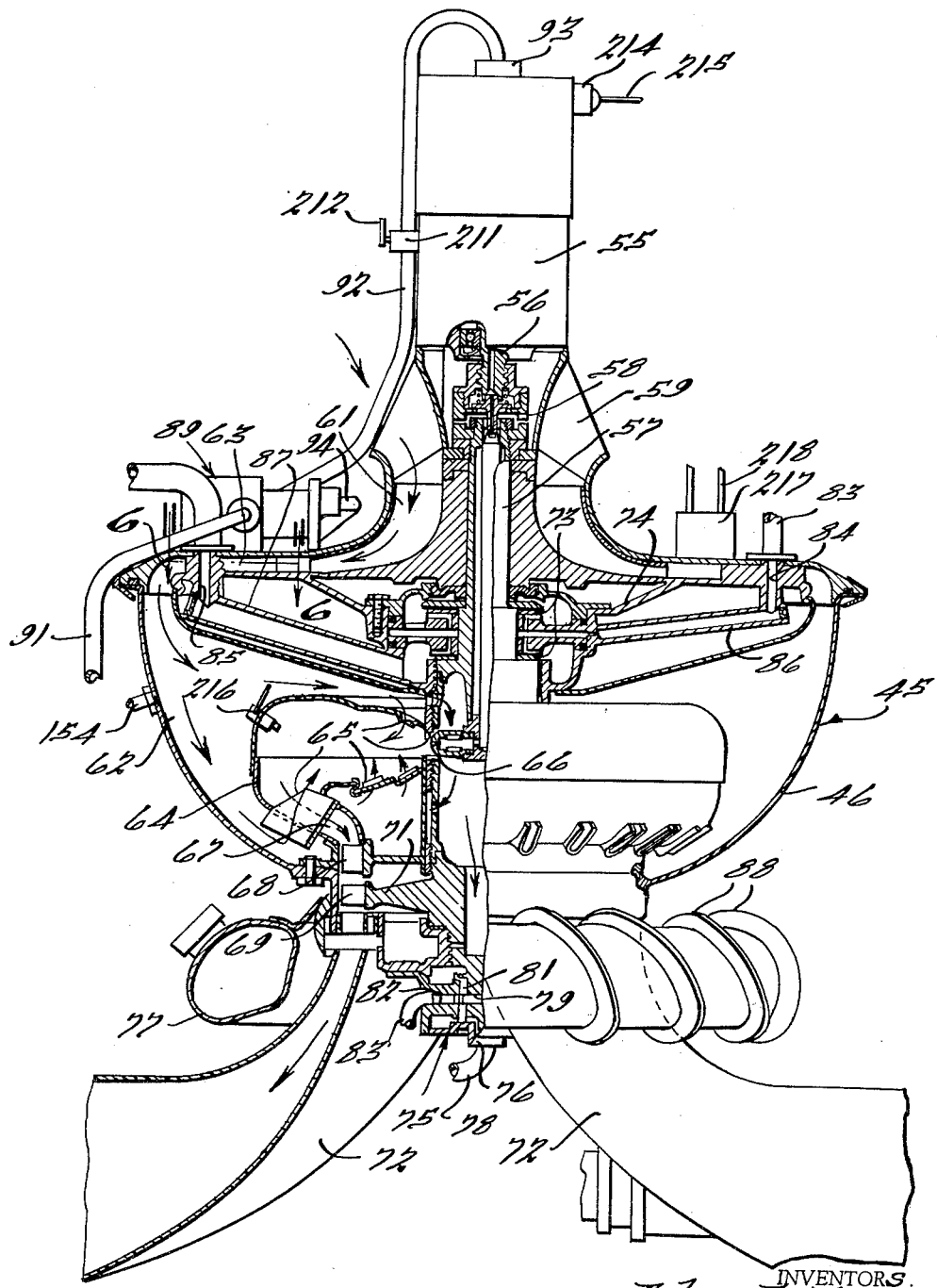

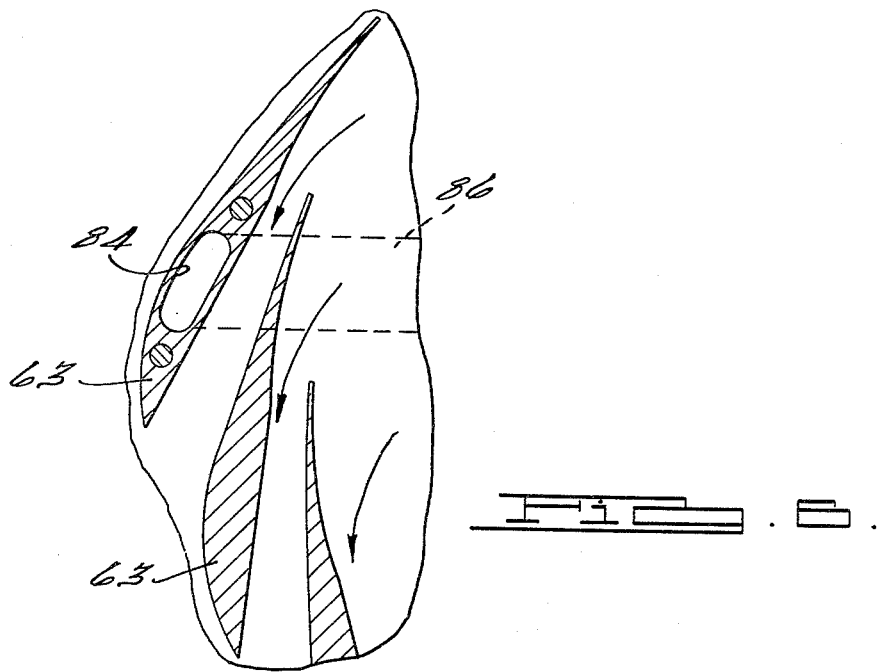
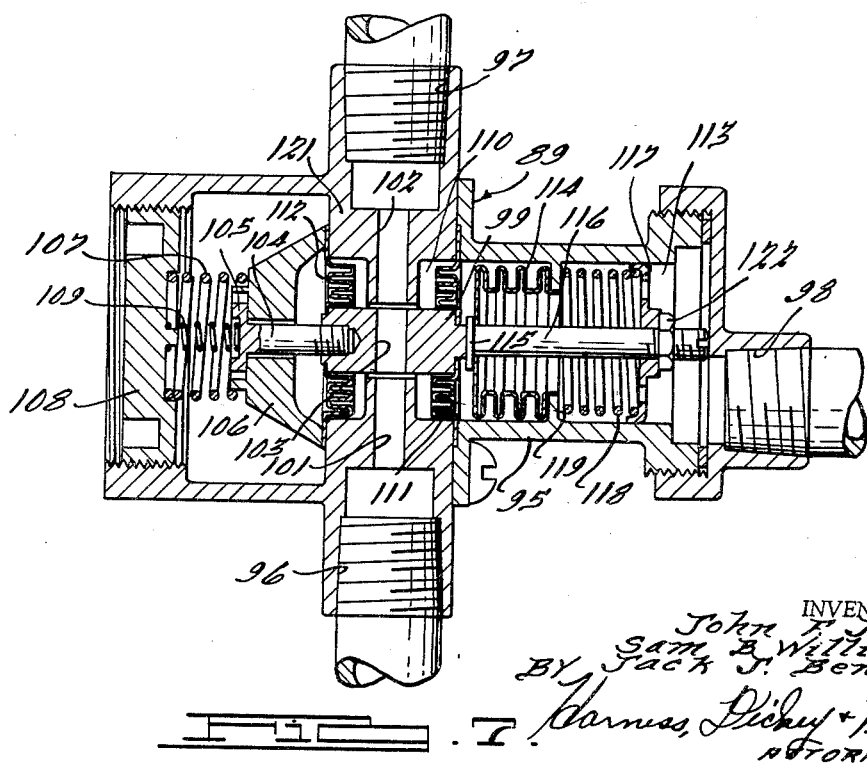

Sept. 4, 1962 J. F. JONES ET AL 3,052,305
PRESSURE JET TYPE HELICOPTER
Filed March 14, 1958 9 Sheets-Sheet 5
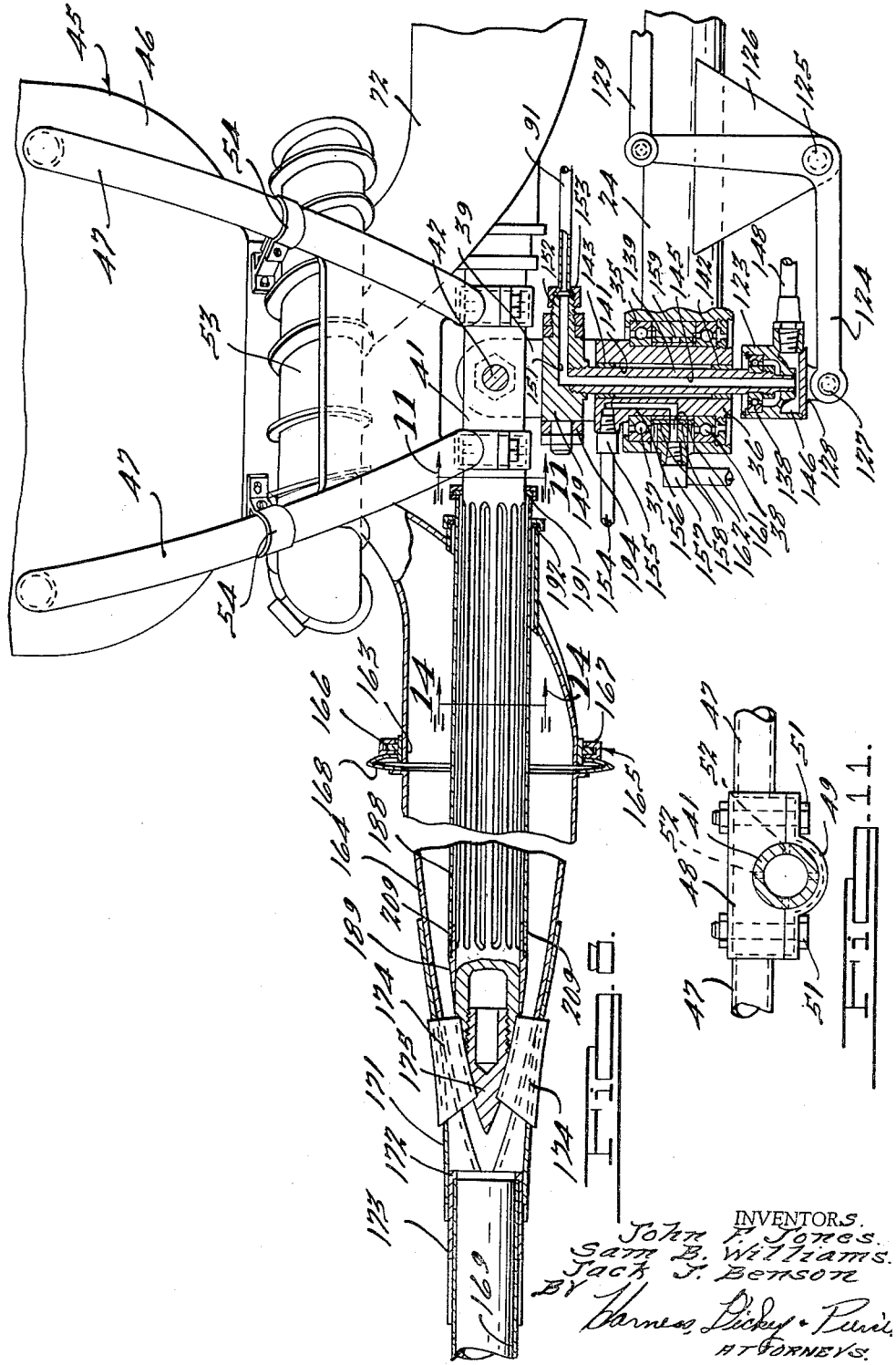
INVENTORS.
John F. Jones.
Sam B. Williams.
Jack J. Benson
BY
Barnes, Kisher & Purvis
ATTORNEYS.

Sept. 4, 1962 J. F. JONES ET AL 3,052,305
PRESSURE JET TYPE HELICOPTER
Filed March 14, 1958 9 Sheets-Sheet 6
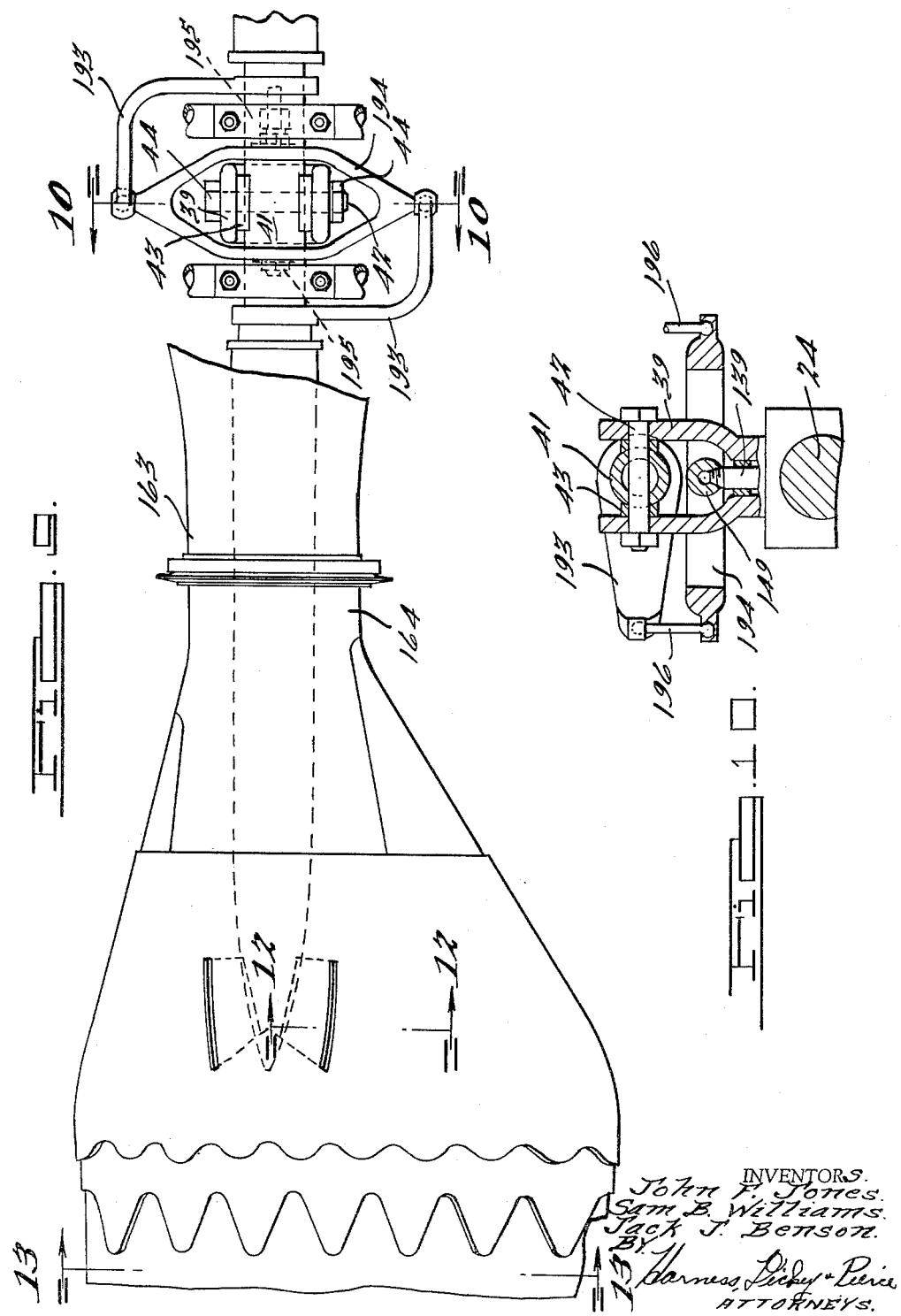
INVENTORS.
John F. Jones.
Sam B. Williams.
Jack J. Benson.
BY
Harness, Dickey & Pierce
ATTORNEYS.

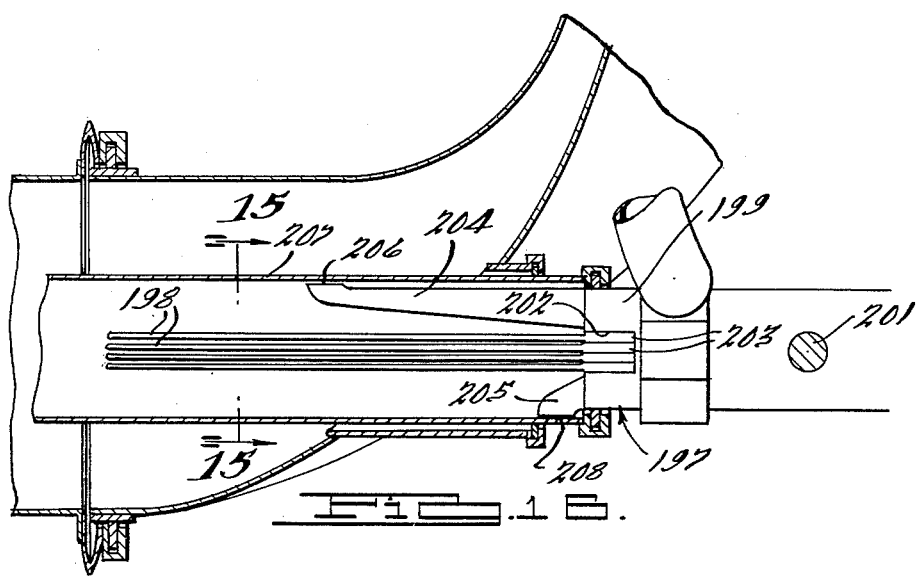
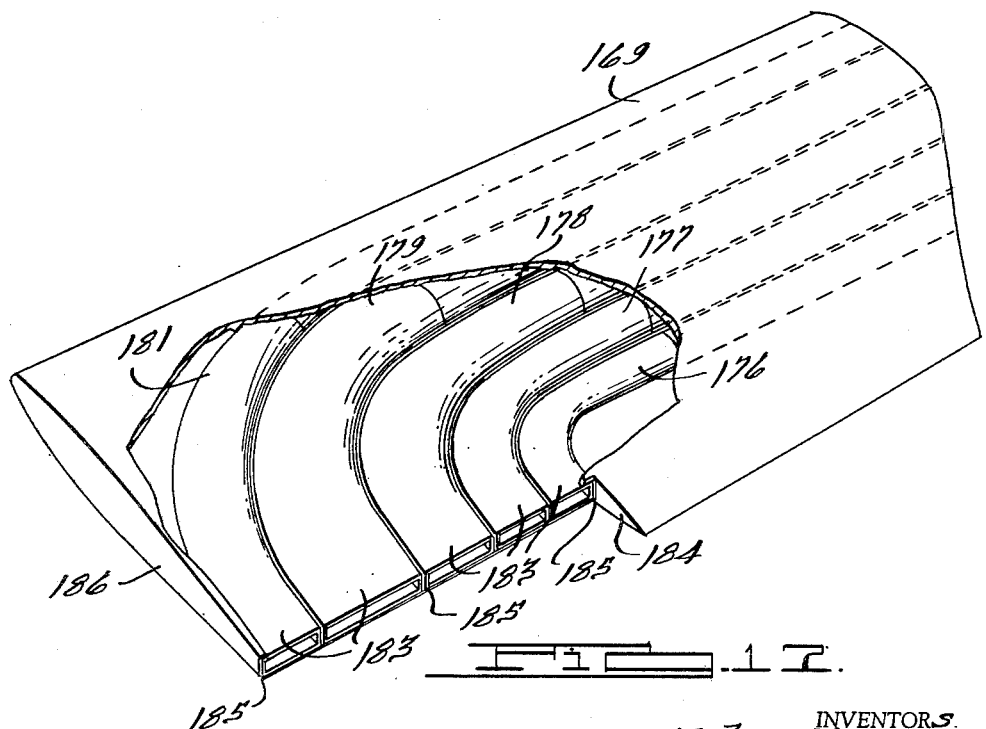

Sept. 4, 1962 J. F. JONES ET AL 3,052,305
PRESSURE JET TYPE HELICOPTER
Filed March 14, 1958 9 Sheets-Sheet 9
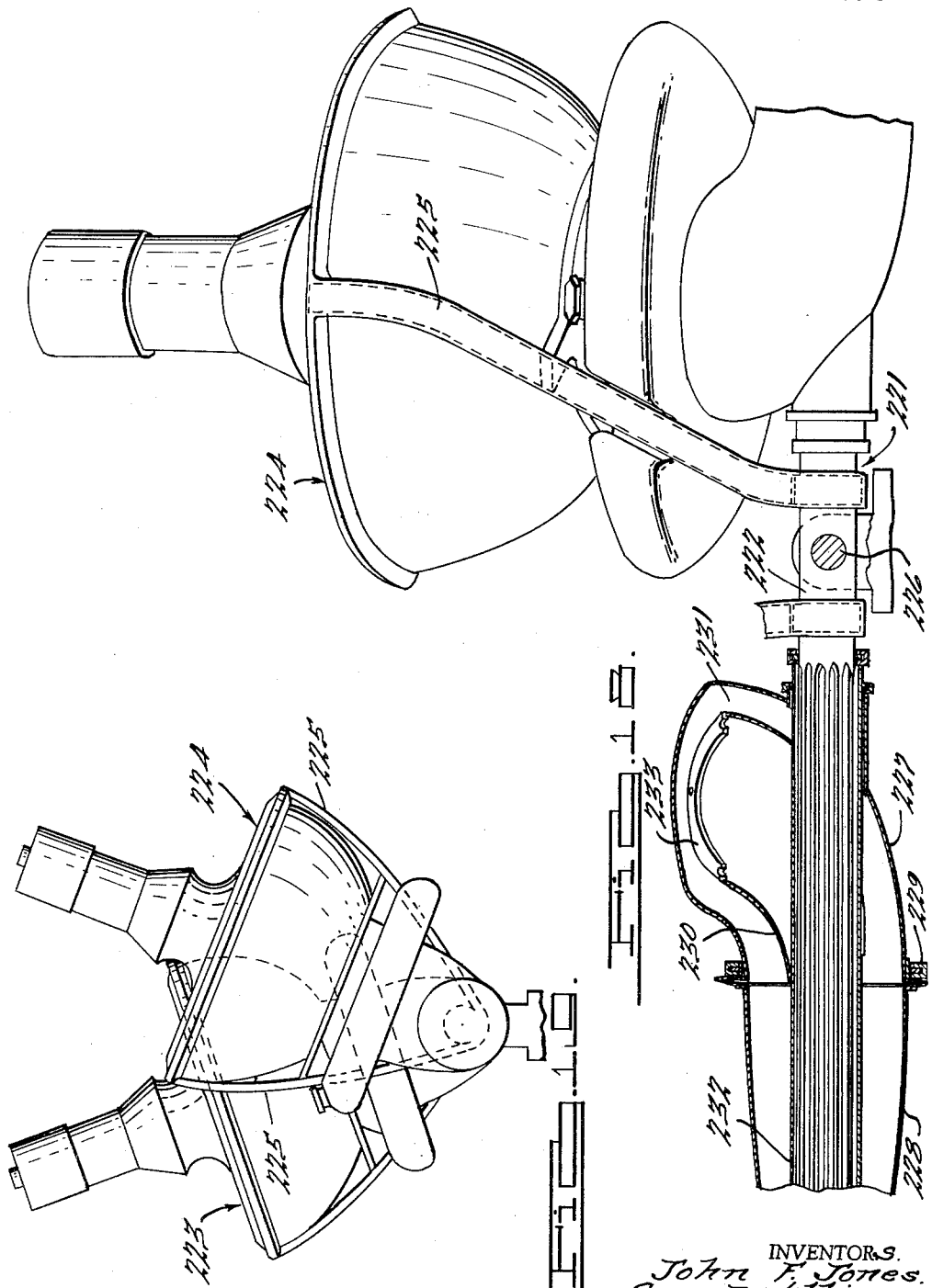
INVENTORS.
John F. Jones.
Sam B. Williams.
Jack J. Benson
BY Barnes, Dickey & Pierce
ATTORNEYS.

United States Patent Office 3,052,305
Patented Sept. 4, 1962

3,052,305
PRESSURE JET TYPE HELICOPTER
John F. Jones, Berkley, Sam B. Williams, Birmingham, and Jack J. Benson, Detroit, Mich., assignors to Williams Research Corporation, Birmingham, Mich., a corporation of Michigan
Filed Mar. 14, 1958, Ser. No. 721,537
27 Claims. (Cl. 170—135.4)

This invention relates to helicopters, and more particularly to aircraft of this type in which the rotor blade is driven by the jet reaction of gases emitted tangentially from the rotor tips.

Although several different types of aircraft have heretofore been proposed in which the lifting and propelling rotor is driven by gases released at the blade tips, serious problems have been encountered in the construction of such craft which have prevented their widespread acceptance and use. Among these problems has been that of providing suitable connections between a gas turbine mounted in the fuselage of the aircraft and the rotor blades. Additional obstacles have been encountered when dealing with the provision of control elements in such craft which could permit maneuverability for ascent and descent as well as for forward flight.

It is an object of the present invention to provide a novel and improved pressure jet type of helicopter which will overcome previously encountered problems, such as those mentioned above, will be easy to fly and have adequate speed and range to accommodate a wide variety of applications.

It is another object to provide an improved helicopter of this type which is of relatively inexpensive construction, requires little maintenance, is inherently stable and facilitates the use of control techniques to which the pilot can naturally adapt himself.

It is a further object to provide an improved helicopter construction having the above characteristics, which eliminates the necessity for transmitting the pressurized gases from a stationary portion of the machine to the rotor blades.

It is also an object to provide an improved helicopter construction of the above nature which eliminates ducting and sealing problems to a large degree while permitting collective pitch changing of the rotor blades in order to vary the lift and propulsive forces on the craft.

It is another object to provide a novel and improved pressure jet type helicopter which includes automatic governing means for varying the fuel rate in accordance with the requirements of the rotor blades, thus greatly increasing the stability of operation of the craft.

It is a further object to provide an improved helicopter of this character which is especially adapted for one or two man aircraft and in which directional control of the craft may be accomplished by pilot leaning techniques.

Other objects, features, and advantages of the present invention will become apparent from the subsequent description, taken in conjunction with the accompanying drawings.

In the drawings:

FIGURE 1 is a perspective view of a preferred embodiment of the novel helicopter shown in flight, the craft being of a single passenger type;

FIGURE 2 is a side elevational view of the helicopter showing the fuel tank, pilot cage and stabilizing fins;

FIGURE 5 is an enlarged side elevational view in cross section of the engine mounted at the center of the rotor assembly and rotating therewith;

FIGURE 6 is a fragmentary cross-sectional view taken along the line 6—6 of FIGURE 5 and showing the shape of the diffuser vanes;

FIGURE 7 is a cross-sectional view in elevation of the rotor speed governor;

FIGURE 8 is a cross-sectional view in elevation of a central portion of the rotor assembly showing the construction of the tension-torsion bar as well as the connecting elements between the engine, rotor blades and mast;

FIGURE 9 is a top plan view of a portion of the construction shown in FIGURE 8 illustrating the gimbal arrangement for collective rotor blade pitch changing;

FIGURE 10 is a detailed fragmentary side elevational view in cross-section of the collective pitch control assembly taken along the line 10—10 of FIGURE 9;

FIGURE 11 is a detailed fragmentary elevational view taken in cross section along the line 11—11 of FIGURE 8 and showing the connection between an engine support tube and the tension-torsion bar;

FIGURE 16 is a fragmentary side elevational view in cross section of a connecting duct between the engine and a rotor showing the modified tension-torsion bar illustrated in FIGURE 15 together with droop stops for supporting the rotor;

FIGURE 17 is a fragmentary perspective view, parts being broken away, of the outer end of one of the rotor blades showing the manner in which the gas ducts are curved to cause tangential emission of the expanding gases;

FIGURE 18 is a fragmentary side elevational view of a modified form of the invention using two engines; and FIGURE 19 is an end elevational view of the structure shown in FIGURE 18.

Figure 3:
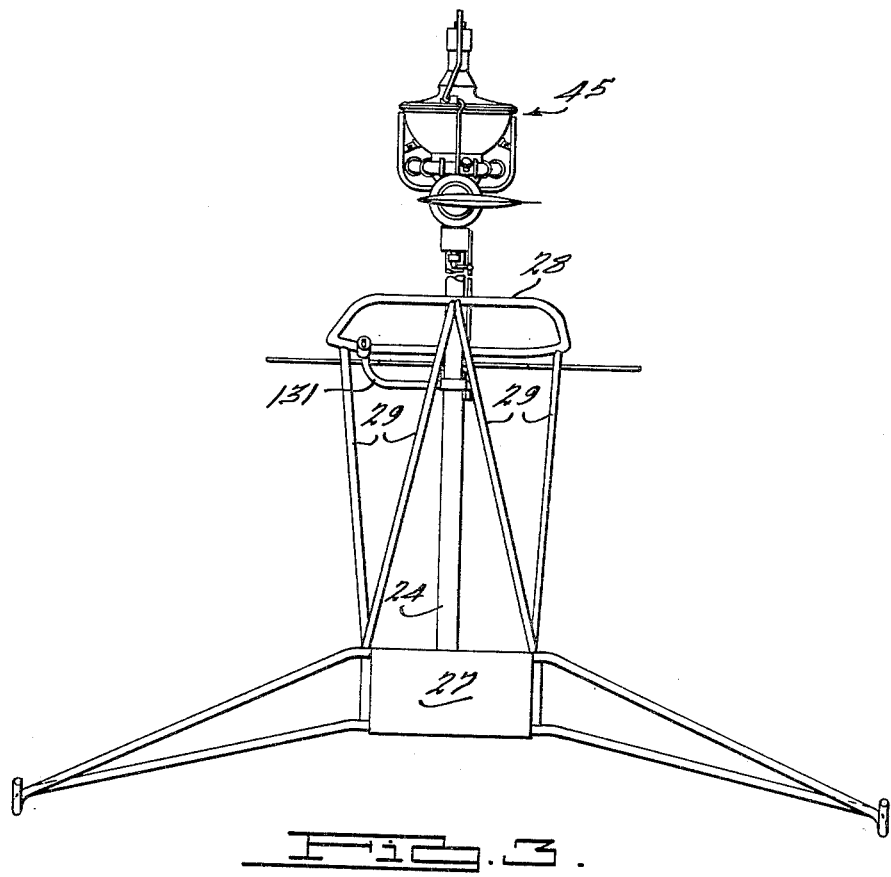
FIGURE 3 is a front elevational view of the helicopter showing the relative positions of the cage, skids and connecting structure.
Figure 4:
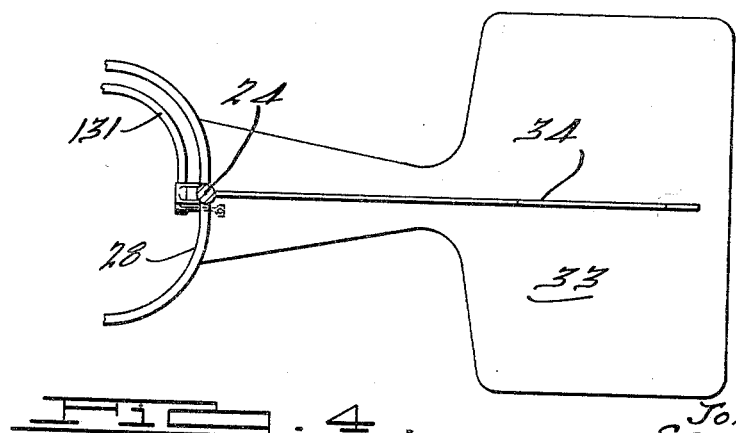
FIGURE 4 is a fragmentary plan view in cross section taken along the line 4—4 of FIGURE 2 and showing the manner in which the collective pitch control lever is mounted.
Figure 12:
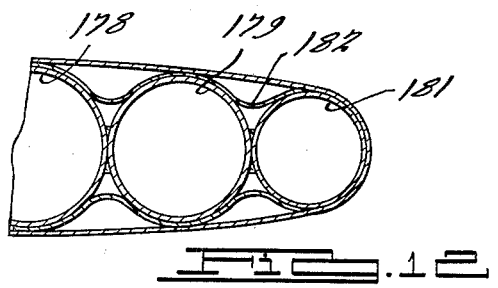
FIGURE 12 is a fragmentary cross-sectional view taken along the line 12—12 of FIGURE 9 and showing the configuration of intermediate portions of the transition ducts leading to the outer portions of the rotor blades.

In general terms, the main illustrated embodiment of the invention comprises a helicopter having a lifting and propulsion rotor with a pair of blades formed thereon and an engine in the form of a gas turbine mounted concentrically on the rotor assembly and rotating therewith, the combustion gases from the engine being led out to the blade tips and ejected tangentially to cause rotation of the rotor. The passenger or cargo supporting structure is in the form of a cage suspended by a mast below the rotor hub and carrying the fuel supply which is fed to the engine through appropriate connections between the stationary and rotating parts of the machine. In a preferred embodiment of the invention, the rotor blades are connected to the load support or cage in such a manner that a pilot standing in the cage may guide the machine by leaning in the proper direction. A collective pitch changing system is provided for controlling vertical ascent or descent. Automatic governing means responsive to changes in the rotational speeds of the main rotor and the turbine rotor control the amount of fuel fed to the engine in order to maintain proper power requirements. The pair of opposed main rotor blades are connected by a tension-torsion bar of novel construction which resists the centrifugal forces on the rotor blades and at the same time permits collective pitch changing of the blades.

Referring more particularly to the drawings, the helicopter is generally indicated at 21 and comprises a load support generally indicated at 22 and a rotor assembly generally indicated at 23. The load support is in the form of a pilot cage and includes a mast 24 to the lower end of which is secured a platform 25 on which a pilot 26 may stand. A fuel tank 27 is secured below platform 25, and a circular guard rail 28 is secured to a midportion of mast 24 above platform 25, braces 29 connecting ring 28 and the platform. A pair of skids 31 are secured below tank 27 by means of struts 32. Extending rearwardly from mast 24 are horizontal and vertical stabilizing surfaces 33 and 34, respectively, which are appropriately shaped to provide stability for the craft during flight.

The upper end of mast 24 is curved forwardly, and rotor assembly 23 is connected to the mast in such a manner that the rotary axis of rotor assembly 23 is fixed relative to the mast. The manner of this connection may be best seen in FIGURE 8 which shows the upper end of mast 24 to which is secured a bearing housing 35. A rotor hub 36 is rotatably mounted in housing 35 by means of antifriction bearings 37 and 38 which take up radial as well as thrust forces on hub 36. The upper end of hub 36 is formed as a clevis, indicated at 39, and a tension-torsion bar 41 is pivoted on a teetering axis within clevis 39 by a pin 42, which comprises a teetering axis, as seen in FIGURES 8, 9 and 10. A pair of spacing members 43 hold bar 41 in position on pin 42, the latter being secured in place by nuts 44. With this arrangement, it will be noted that when rotor assembly 23 is rotated by the tangential emission of expanding gases from the rotor blade tips, tilting of mast 24 in any direction will cause corresponding tilting of the rotary axis of rotor assembly 23 which is the central axis of hub 36.

A gas turbine engine generally indicated at 45 forms part of rotor assembly 23, this engine being mounted on the rotary axis of the rotor assembly. The engine comprises a housing 46 which is secured above tension-torsion bar 41 by means of four support tubes 47 spaced around casing 46. The upper ends of tubes 47 are welded or otherwise secured to housing 46, and the lower ends are secured to opposite sides of a pair of blocks 48, as seen in FIGURE 11. Blocks 48 are recessed to receive tension-torsion bar 41, a pair of recessed brackets 49 being clamped to the underside of bar 41 and secured to blocks 48 by bolts 51. Preferably, tubes 47 are of hollow construction so that air may be tapped from housing 46 to be fed through tension-torsion bar 41 for cooling purposes, as will be later described. Blocks 48 may likewise be hollow for this purpose, with a plurality of radial apertures 52 provided in the tension-torsion bar in order to carry the cooling air to the interior of the hollow bar, as seen in FIGURE 11. A plurality of stiffening plates 53 may be provided between the lower portions of tubes 47, as is illustrated in FIGURE 8, and suitable stabilizing brackets 54 may likewise be provided which connect the intermediate portions of tubes 47 with the engine housing.

The details of construction of engine 45 are illustrated in FIGURE 5. In several respects, this engine is similar in construction to that disclosed and claimed in application Serial No. 542,328, filed October 24, 1955, now abandoned, by Sam B. Williams and Jack J. Benson, entitled "Gas Turbine" and assigned to the assignee of the present application. Centrally mounted at the upper end of housing 46 is an electric starting motor 55 having a hollow central shaft 56 which serves as a fuel inlet. Starting motor 55 is adapted to drive engine shaft 57 through an overrunning clutch 58 of conventional construction.

The air intake for engine 45 is indicated at 59 and surrounds the lower portion of motor 55, this intake leading to a compressor 61 fixed to shaft 57. The compressor is adapted to deliver air to an annular chamber 62 within housing 46. A plurality of diffuser vanes 63 are disposed within the entrance to chamber 62, these vanes being disposed so as to impart a spiral motion to the air, as indicated in FIGURE 6. A combustion chamber 64 is disposed within chamber 62 and has a plurality of entrance passages 65 through which the compressed air may flow as shown by the arrows in FIGURE 5. Fuel is fed to the central portion of annular combustion chamber 64 through hollow shaft 57 to a plurality of nozzles 66 from which the fuel is radially sprayed to the combustion chamber. The combustion gases are led through an annular exit passage 67 to a row of stator blades 68, the gases then impinging upon rotor blades 69 of a rotor 71 which is secured to shaft 57. The gases leaving rotor blades 69 then enter a dual outlet collector 72 whence the gases are led to the rotor blades, as will be later described.

Engine 45 includes several novel features which contribute substantially to the operational efficiency of the helicopter. The engine shaft is supported and held in proper position by thrust and radial bearings 73 which are held by an internally projecting supporting structure 74 within the housing. High pressure oil for lubricating these bearings is provided by a centrifugal pump generally indicated at 75 located at the lower end of the engine shaft. Pump 75 has an axial entrance passageway 76 to which oil is supplied from an annular reservoir 77 surrounding the lower portion of the engine through a conduit 78 which is partially shown in FIGURE 5. A radial aperture 79 is provided in shaft 57 and oil flowing into passage 76 is pumped out through passage 79 by centrifugal force as the shaft rotates. A radial bearing 81 for shaft 57 is disposed immediately above passage 79 and is lubricated directly thereby. The main portion of oil pumped outwardly through passage 79 flows through a radial passage 82 in the stationary portion of the engine to a conduit 83.

As seen best in FIGURE 5, two diffuser vanes 63 are provided with internal passages 84 and 85 respectively, and conduit 83 is connected with passage 84. Passage 84 is connected by a conduit 86 to bearings 73, and the oil flowing to the bearings may then return through another conduit 87 connected to passage 85, being led outwardly of the housing and back to reservoir 77. Pump 75 is preferably of sufficient capacity to draw oil radially inwardly from reservoir 77 against the action of centrifugal forces exerted on the oil by the rotation of reservoir 77 at the speed of rotor assembly 23. Reservoir 77 is provided with a plurality of cooling fins 88 which aid in cooling the lubricant during flight.

Means are provided for automatically governing the amount of fuel fed to engine 45 in response to changes in the speed of rotor assembly 23 as well as the speed of engine shaft 57. This fuel control unit is generally indicated at 89 and may be mounted on the upper portion of turbine housing 46, as seen in FIGURE 5. A fuel conduit 91 connected to tank 27 through the rotor hub, as later described, conducts fuel to unit 89, and a conduit 92 carries fuel from the unit and to a port 93 at the upper end of hollow motor shaft 56. A conduit 94, likewise seen in FIGURE 5, conducts pressurized engine oil from pump 75 to unit 89. Conduit 94 may be a branch of conduit 83 and the pressure in this conduit will be proportional to the square of the speed of engine shaft 57.

The details of construction of fuel control unit 89 are best seen in FIGURE 7. The unit comprises a housing 95 having a fuel inlet port 96 to which conduit 91 is connected and a fuel outlet port 97 leading to conduit 92. An oil pressure port 98 is also provided at one end of housing 95 for connection with conduit 94. A valve 99 is disposed between a pair of aligned passageways 101 and 102 which are connected with ports 96 and 97, respectively. Valve 99 is slidable in a direction transverse to these passageways and has a connecting passageway 103 which may permit varying amounts of fuel to flow through the passageways, depending on the extent of alignment between passageway 103 and passageways 101 and 102. Valve 99 has a rod 104 with a head 105 secured to one end thereof, and a weight 106 is loosely mounted on rod 104. The mounted position of unit 89 on engine housing 46 is such that when the engine housing is rotating along with rotor assembly 23, weight 106 will tend to move to the left as seen in FIGURE 7, thus engaging shoulder 105 and tending to move valve 99 toward a position in which less fuel is permitted to flow from passageway 101 to passageway 102. A coil spring 107 is engageable with weight 106 and urges the weight to the right as seen in FIGURE 7, the other end of this spring being supported by an axially adjustable stop 108 threaded in housing 95. In this manner the compression of spring 107 may be adjusted so that weight 106 will move a predetermined distance at a preselected rotor speed. A relatively light spring 109 is supported by stop 108 and engages shoulder 105 of rod 104, urging valve 99 to the right, that is, to its fully open position as determined by the engagement of weight 106 with a shoulder 121 in the housing.

Fuel flowing from passageway 101 to passageways 103 and 102 is confined within a chamber 110 by a pair of seals 111 and 112 in the form of bellows diaphragms. Oil port 98 is connected to a chamber 113 in housing 95, and a bellows diaphragm 114 is disposed within the housing and has an open end connected with chamber 113. The other end of bellows 114 is secured to a shoulder 115 on a shaft 116 which abuts the end of valve 99 opposite rod 104. The outer end of shaft 116 carries a stop 117, perforated to permit passage of oil to bellows 114, and a coil spring 118 is confined between this stop and a shoulder 119 formed at an intermediate portion of housing 95, the open end of bellows 114 fitting within an apertured portion of this shoulder. Spring 118 tends to compress bellows 114 and urges shoulder 115 in a direction away from valve 99. A nut 122 threaded on the end of shaft 116 holds stop 117 in place, the stop being axially adjustable to vary the compressive force of spring 118. The arrangement is such that when the pressure of oil in bellows 114 exceeds a predetermined amount, it will overcome the force of spring 118, causing shoulder 115 to push against the end of valve 99 to move it to the left in FIGURE 7 and so reduce the fuel flow.

Preferably, bellows 114 acts as an overspeed device to prevent excessive speed of the engine shaft, but will normally have no effect in controlling movement of valve 99. This movement will be primarily controlled by the instantaneous position of weight 106 which, as stated previously, is responsive to rotational speed of rotor assembly 23. For example, should the collective pitch of the rotor blades be increased, this would have the initial effect of slowing down the rotor assembly due to the increased air resistance. This will cause rightward movement of weight 106 from an intermediate position, thus opening valve 99 to permit more fuel to flow to the turbine. The turbine will thus emit gases at a higher pressure and the compressor speed of the turbine will increase accordingly. The increased turbine rotor speed, however, will ordinarily not increase the oil pressure in bellows 114 sufficiently to counteract the original valve opening movement and the additional power supply will thus be fully effective to accelerate the rotor assembly back to its initial speed.

In this connection, it should be pointed out that even though the effective turbine rotor speed depends upon the speed with which the rotor assembly and therefore the turbine stator is rotating, the difference between these rotational speeds will ordinarily be so great that slight changes in the rotor assembly speed will not affect the turbine rotor speed. For example, a typical engine rotor will run at about 60,000 r.p.m. while the helicopter rotor assembly 23 will rotate at about 400 r.p.m.

The rotor hub and rotor blade constructions are seen best in FIGURES 8 to 10. As indicated previously, rotor hub 36 is rotatably supported by bearings 37 and 38 which are mounted within housing 35. Mast 24 supports an additional bearing housing 123 which is disposed below housing 35 and is movable in a vertical direction by means of a bell crank 124 pivoted at 125 to a bracket 126 secured to mast 24. One arm of bell crank 124 is pivotally connected at 127 to a lug 128 extending below housing 123. The other arm of the bell crank is operable by a link 129 which, as seen in FIGURE 2, is moved by a manual control lever 131 through the medium of a link 132 and a second bell crank 133 pivoted on a bracket 134 at the upper end of the mast. Lever 131 is pivoted on a bracket 135 secured to an intermediate portion of the mast and extends into the cage, bracket 135 having a plurality of apertures 136 which may act as detents in conjunction with a flexible cable 137 on lever 131 which is accessible to the pilot. By adjusting handle 131 it will be observed that housing 123 may be adjusted vertically in a variety of positions.

Housing 123 carries an antifriction bearing 138 which rotatably supports a pitch control rod 139 extending upwardly therefrom through a central aperture 141 in rotor hub 36. Additional bearings 142 and 143 are provided in aperture 141 for slidably and rotatably supporting rod 139. This rod serves to adjust the collective pitch of the rotor blades, as will later be described, and also serves to conduct fuel from the tank to the engine. The latter function is served by a central passageway 145 in rod 139 which is connected at its lower end to a chamber 146 in housing 123, this chamber being in turn connected to a conduit 148 which runs down along the mast to the fuel tank. The upper end of rod 139 has a cylindrical member 149 threaded thereon, this member being disposed between the arms of clevis 39 and having a passageway 151 which is connected with passageway 145 and passes through a threaded projection 152 on member 149. Flexible conduit 91 is connected to the outer end of projection 152 by a threaded coupling member 153 and leads to the fuel control unit.

The rotor hub also includes means for transmitting air pressure from the engine to the upper portion of the fuel tank in order to force fuel upwardly to the engine. This transmission means includes a flexible hose air bleed 154, seen best in FIGURE 5, which is connected to the engine housing and leads to a fitting 155 secured to the upper end of hub 36. A passageway 156 within the hub leads the air from fitting 155 to a fitting 157 on stationary housing 35. This connection is through a pair of seals 158 which separate the stationary and moving parts, these seals having an annular slot 159 therebetween which connects passageway 156 with a passageway 161 in housing 35 connected to fitting 157. A conduit 162 leads from fitting 157 down along the mast to the fuel tank.

Figure 13:
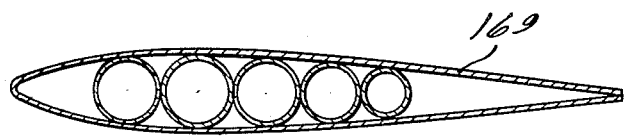
FIGURE 13 is a cross-sectional view taken along the line 13—13 of FIGURE 9 and showing the arrangement of the gas ducts within a faired rotor blade.

The rotor blade construction is best seen in FIGURES 8, 9, 12, 13 and 17. The parts which will now be described are those which conduct the gases from dual outlet collector 72 to the blade tips, it being understood that these parts do not serve as the main support of the rotor blades, the latter function being accomplished by tension-torsion bar 41 which will be later described. The dual outlet collector terminates in two diametrically opposed outwardly directed circular exits 163, as indicated in FIGURES 8 and 9. Two transition ducts 164 are connected to exits 163 and serve to change the cross-sectional shape of the combustion gas conduits to an airfoil configuration, as seen in FIGURE 13. A seal generally indicated at 165 connects the circular end of each transition duct 164 with the outer end of its corresponding exit 163. This seal comprises a springlike sealing ring 166 which grips the periphery of exit 163 and an annular slotted member 167 mounted on flange 166. Member 167 is secured to transition duct 164 through a bellows 168 which permits deflection of the transition duct with respect to collector 72.

Member 167 is rotatably mounted on ring 166 so that when the pitch of the rotor blades is changed, as later described, transition ducts 164 may be rotated with respect to collector outlet 72. The sliding connections between rings 166, members 167 and the peripheries of ducts 163 are such that the gases will be prevented from leaking out through the connections between the ducts.

The outer end of each transition duct 164 is connected to an airfoil-shaped rotor blade 169 by means of a muff 171 which is welded or otherwise secured to transition duct 164 and extends outwardly therefrom with a narrowing cross-sectional shape. A rib 172 is disposed at the inner end of each blade 169, the blade being welded or otherwise secured to the rib which is in turn secured within the outer end of muff 171. Muff 171 together with rib 172 form a rigid connection between each transition duct 164 and its corresponding blade 169. A doubler plate 173 may also be provided between the overlapping portions of each muff 171 and blade 169. Each muff 171 is secured to the corresponding outer end of tension-torsion bar 41 by a plurality of tie plates 174 which are secured to the tapered outer end 175 of the tension-torsion bar and extend radially outwardly therefrom, the outer edges of these tie plates being secured to the muff.

The interior of each transition duct 164 and its attached rotor blade 169 are provided with a plurality of fairing stampings and tubes which provide a shielding effect to prevent the hot gases from overheating the stressed outer duct members. More particularly, five tubes 176, 177, 178, 179 and 181 are provided within each rotor blade 169, as seen in FIGURE 17, these tubes being connected at their inner ends to fairing stampings 182 which provide a smooth passage of the gases from transition duct 164. The five tubes 176 to 181 are welded to rib 172 to support them under the centrifugal load of the whirling rotor. The outer ends of tubes 176 to 181 carry outlet elbows 183 which, as seen in FIGURE 17, conduct the gases into a tangential direction with respect to the rotor blade, emitting the gases out of an aperture 184 in the trailing end of the rotor blade tip. The outlet ends of elbows 183 are aligned in a radial direction, and spaces 185 are provided around the elbows and adjacent end 186 of rotor blade 169 to provide for thermal expansion.

Figure 14:
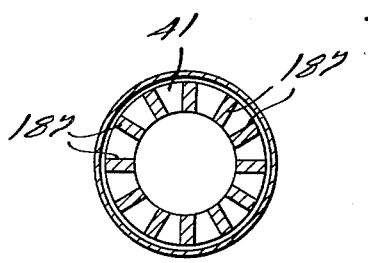
FIGURE 14 is a cross-sectional view of the tension-torsion bar taken along the line 14—14 of FIGURE 8.

The construction of tension-torsion bar 41 and its attendant mechanism is best seen in FIGURES 8, 9, 10 and 14. The tension-torsion bar is adapted to hold the rotor blades against the action of centrifugal forces, support the blades against drooping when they are stationary, resist the lifting forces which tend to bend the blades upwardly when the craft is flying, and permit simultaneous pitch changing of the blades. The bar comprises a tubular shaft pivoted at its center on teetering pin 42 and having tapered outer ends as discussed above to which tie plates 174 are secured. The intermediate portions of bar 41 between its tubular central portion and its tapered ends are provided with a plurality of circumferentially spaced longitudinal slots, these slots extending radially from the inner to the outer diameter of the tube to provide a group of stringers 187 having rectangular cross sections, as seen in FIGURE 14. Fixed to the outer ends of bar 41 immediately inwardly of the tapered tips 175 are a pair of torsion tubes 188, these tubes being fixed to the bars by means of adapter members 189 as seen in FIGURE 8. The diameter of tubes 188 is slightly larger than that of the tension-torsion bar, and the inner ends of the tubes are connected to the bar by means of a pair of sliding seals 191 which permit relative rotation between the inner ends of tubes 188 and the bar 41 while preventing the escape of air. These seals 191 are spaced outwardly a short distance from the teetering axis 42 of the tension-torsion bar. Bar 41 and its surrounding tubes 188 pass through transition ducts 164, entering these ducts through a pair of sealing members 192, as seen in FIGURE 8, so that the hot gases within the ducts cannot escape.

The purpose of torsion tubes 188 is to simultaneously apply rotative forces in opposite directions to the outer ends of tension-torsion bar 41, thus changing the pitch of rotor blades 169, the slotted portions of the tension-torsion bars being twisted during this movement. For this purpose a pair of arms 193 are secured to the inner ends of tubes 188 adjacent seals 191, the outer ends of these arms being bent toward each other, as seen in FIGURE 9. A gimbal 194 having a forked central portion is secured to the opposite ends of cylindrical member 149 by means of nuts 195 threaded on projecting portions of member 149. The outer ends of this gimbal are connected by elements 196 with the outer ends of arms 193. The arrangement is such that upward movement of pitch adjusting rod 139 will cause arms 193 to be raised, thus twisting rotor blades 169 in a direction to reduce the angle of incidence. Lowering of rod 139 will cause the rotor blades to twist in the opposite direction, increasing the angle of incidence of the blades. It should be noted that pitch changing is accomplished in this manner without the use of bearings, thus eliminating a serious cause of maintenance difficulties in conventional types of helicopters. The elimination of bearings for pitch changing purposes is especially advantageous in the illustrated construction since the high-temperature environment of the hub in the pressure-jet type of rotor increases possible problems due to the overheating of bearings.

It will be understood that other cross-sectional shapes for the tension-torsion bar could be selected within the principles of the invention. As indicated previously, this bar must hold the rotor blades against the action of centrifugal forces, must provide sufficient torsional flexibility for the required pitch changes, withstand the action of flight loads on the rotor blades, and support the weight of the blades when they are stationary. While the type of section to be used for the tension-torsion bar will be based on blade stress analysis, study of fabrication methods and stress analysis of the tension-torsion bar, several important coniderations must be kept in mind. The total cross-sectional area of the intermediate bar portions must be sufficient to maintain a reasonably low stress level when the bar is subject to tensional forces. In achieving the necessary torsional flexibility, thin but wide sections could be used to provide the required tension area since torsional stiffness is approximately proportional to the cube of the thickness and the first power of the width of a rectangular cross-sectional shape. The effect on overall tension of increasing the torsional stiffness and therefore weigh of the bar must also be considered. For this reason it is desirable that the overall dimenision of the bar be kept as small as possible.

Figure 15:
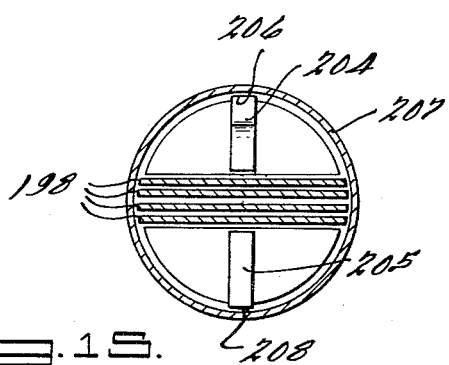
FIGURE 15 is a cross-sectional view similar to FIGURE 14 showing a modified shape of the tension-torsion bar.

FIGURE 15 shows a modification of the tension-torsion bar generally indicated at 197 in which the intermediate portions of the bar are composed of a plurality of overlapping horizontal plates 198. Plates 198 are spaced apart a sufficient distance to permit torsional movement of the bar without interference between the plates. Since this type of cross-sectional shape does not have substantial rigidty in a vertical bending direction, means are preferably provided for resisting droop and lifting forces. Such means are indicated in FIGURE 16 which shows tension-torsion bar 197 having plates 198 at its intermediate portions. The central portion 199 of bar 197 comprises a solid cylindrical member supported on a teetering axis 201 similar to axis 42 of the embodiment shown in FIGURE 8. The opposite ends of member 199 are slotted at 202 to receive the inner ends 203 of plates 198, these ends being thicker than the main portions of the plates. Preferably, ends 203 of plates 198 are welded or otherwise rigidly secured within slots 202. A pair of droop stops 204 and 205 are secured to each end of member 199 above and below plates 198 respectively. Stop 204 extends a substantial distance outwardly from member 199 and has an upwardly projecting surface 206 at its outer end, this surface being engageable with the interior of a torsion tube 207 which is analogous to tube 188 of the embodiment shown in FIGURE 8. Stop 205 is somewhat shorter than stop 204 and has a downwardly facing surface 208 engageable with the lower surface of the interior of tube 207. It will thus be seen that droop of the rotor blades will be resisted by the cantilever action of droop stops 204 and 205.

Means are preferably provided for cooling the tension-torsion bar during operation. It will be noted that since the bar is surrounded by hot gases flowing within ducts 164, it will be subjected to excessive temperatures which may have a deleterious effect on the material. As previously described, engine support tubes 47 are hollow and, as indicated in FIGURE 8, may tap compressed air from their connections with housing 46 of the engine. Tubes 47 will conduct this air downwardly to the interiors of blocks 48, whence the air will flow through radial passageways 52, as indicated in FIGURE 11, to the interior of the tension-torsion bar. The cool air will then flow radially outwardly through the tension-torsion bar in opposite directions, flowing through the interstices between stringers 187 of the bar into the annular space between the bar and tube 188. A plurality of apertures 209 are provided adjacent the outer ends of tubes 188, and the cooling air will flow outwardly through these apertures and will mix with the combustion gases which are flowing through ducts 164. It will thus be seen that, besides their function of transmitting torsional forces to the rotor blades, torsion tubes 188 will also serve as cooling jackets for the intermediate portions of tension-torsion bar 41.

Operation

In order to start the helicopter, a separate idle valve 211, best seen in FIGURE 5, is provided in fuel conduit 92, this valve having a handle 212 movable between a first position permitting full flow of fuel and a second position permitting only a restricted flow of fuel for idling purposes. Valve 211 will be set to its idle position, and a battery 213 mounted on platform 25 of the helicopter, as shown in FIGURE 2, will be connected temporarily to an electrical receptacle 214 adjacent electric starting motor 55 by an electrical conduit 215. Receptacle 214 is connected to electric motor 55 and is also connected to an ignition spark plug 216, seen in FIGURE 5, through an ignition coil 217 mounted on housing 46. Ignition coil 217 is connected to plug 216 by a conduit shown partly at 218.

Engine shaft 57 will be turned over by electric motor 55 through overrunning clutch 58, and spark plug 216 will ignite the mixture of air and fuel particles in combustion chamber 64. At the idle setting of valve 211, combustion chamber 64 will emit sufficient hot gases to permit rotor blades 69 to drive the compressor but not enough to apply appreciable torque to rotor blades 69, so that rotor assembly 23 will not be driven. It is for this reason that electrical conduit 215 may run from battery 213 to receptacle 214 on electric motor 55.

When the engine comes up to its normal speed at the idle setting of valve 211, conduit 215 will be disconnected from receptacle 214. Before moving valve 211 to its full flow position, it should be made certain that selective pitch lever 131 is set to its zero pitch position so that as the rotor assembly increases in speed there will not be a sudden lifting force applied to the helicopter. Valve 211 may then be turned to its full flow setting and the pilot will enter the cage. Normally, it will take only a few seconds for the engine rotor to increase to full speed, and the helicopter rotor will then gradually pick up speed also.

When the pilot wishes to take off, he will raise lever 131, causing pitch adjusting rod 139 to be lowered through the linkage seen in FIGURE 2. Gimbal 194 will be lowered, lowering arms 193 and rotating torsion tubes 188. This will cause twisting of torsion bar 41 and subsequent changing in pitch of rotor blades 169 to increase their angle of incidence.

After the helicopter has been lifted off the ground, forward flight may be achieved by the pilot's leaning forwardly in the cage. This will shift the center of gravity and cause the axis of rotor assembly 23 to be tilted forwardly, so that the rotor blades have a horizontal as well as a vertical force component on the cage. Should the pilot desire to increase his speed at this time, lever 131 will be raised still further, increasing the angle of incidence of rotor blades 169.

When the rotor blades increase their angle of incidence, they will tend to slow down due to the increased air resistance. This will cause shifting of valve 99 in fuel control unit 89 due to the lessening of centrifugal force on weight 106. An increased flow of fuel will thus be fed to the gas turbine, increasing the output of combustion gases to drive the rotor at its normal rate of speed.

It should be noted that the only forces tending to rotate the cage will be the very slight rotational forces transmitted through antifriction bearings 37, 38 and 138. These forces will be easily resisted by vertical stabilizing fins 34. Should the pilot desire to veer to the left or right, it is merely necessary for him to lean in the desired direction, thus shifting the center of gravity sufficiently to shift the axis of rotation of rotor assembly 23.

During operation, air bled from connection 154 will feed pressurized air to the upper portion of fuel tank 27, thus forcing fuel up to the engine. Air bled through engine support tubes 47 will be fed as cooling air through tension-torsion bar 41, exiting through apertures 209 in torsion tubes 188 and mixing with the hot gases passing through ducts 164. These hot gases will be channeled by fairing members 177 to tubes 176 to 181, these tubes directing the gases out through the rotor tip openings 184 in a tangential direction. It should be observed that changing the pitch of rotor blades 169 will not impose any stresses on tubes 176 to 181, because sliding seals 165 will permit free rotation of the rotor blades and transition ducts 164 with respect to dual outlet collector 72.

Should the engine rotor speed become excessive, the increased oil pressure from pump 75 will be transmitted to port 98 of fuel control unit 89, causing valve 99 to shift to the left and restrict fuel flow. If the pilot desires to descend or to decrease his speed, he will lower lever 131, raising pitch control rod 139 and causing blades 169 to decrease their pitch. In this manner the helicopter may be safely brought to a landing, a shutoff valve 219 located in fuel conduit 148 being closed by pilot 26 to stop the engine.

FIGURES 18 and 19 show a portion of a modified form of the invention which is generally similar to that already described, but includes two separate engines, each of which is adapted to supply a single rotor blade. The modified rotor assembly is indicated generally at 221 and includes a tension-torsion bar 222 having a construction similar to that of tension-torsion bar 41 of the previous embodiment. This bar supports two gas turbines generally indicated at 223 and 224 respectively, these turbines being supported by means of a plurality of tubular struts 225 similar to struts 47. The two turbines are disposed on opposite sides of the rotor axis which passes through teetering axis 226 on which tension-torsion bar 222 is pivoted. As seen in FIGURE 19, the two turbines are slightly inclined to opposite sides of the rotor axis for clearance purposes. Preferably, the angles of inclination are kept to a minimum in order to prevent a gyroscopic effect during flight. The relative locations of the turbines are such that their common center of gravity is on the rotor axis.

As seen in FIGURE 18, the outlets 227 of turbines 223 and 224 are connected to transition ducts 228 by means of sliding seals 229 as in the previous embodiment. Fairing members 230 are provided within outlet ducts 227 to provide annular spaces 231 for the flow of combustion gases, these fairing members leading to and surrounding intermediate portions of torsion tubes 232. Flanges 233 may be provided on fairing members 230 for connection to the engine housings.

Aside from the benefit of greater power which would be present in a two-engine embodiment of the invention, such as that illustrated in FIGURES 18 and 19, an added advantage would be that flight could be maintained even if one engine failed. With the present invention, this dual engine safety feature may be obtained without complex connecting transmissions or overrunning clutches which would normally be required in a mechanically driven dual engine rotor system. Although the embodiment illustrated in FIGURES 18 and 19 shows each turbine as supplying only one rotor blade, it would be possible for each engine to supply a portion of ducts in each rotor blade. Instead of mounting the engines in inclined relation as shown, the construction could be altered to have the turbine axes parallel to the rotor axis.

It will thus be seen that a novel and improved helicopter construction is provided which greatly simplifies both construction and operation of the craft, eliminating reaction forces on the load support and minimizing maintenance problems. While the illustrated embodiments of the invention show a load support with room for a single pilot, other types of load supports could be provided within the principles of the invention.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a helicopter, a load support having a mast, a rotor assembly supporting member mounted at the upper end of said mast for rotation on a vertical axis, a tension-torsion bar secured to the upper end of said support member on a horizontal teetering axis, said bar extending outwardly from said axis in opposite directions, a pair of rotor blades of airfoil-shaped cross section carried by the outer ends of said bar, the intermediate portions of said bar being formed to permit torsional deflection, gas turbine means centrally supported by said bar, duct means leading from said gas turbine means to the tips of said rotor blades, means for directing gases tangentially from said tips, and means on said load support connected to the outer ends of said tension-torsion bar for twisting said opposite ends simultaneously to collectively change the pitch of said rotor blades.

2. The combination according to claim 1, said last-mentioned means comprising a pair of torsion tubes surrounding said tension-torsion bars, said tubes being fixed to the outer ends of said tension-torsion bars and and extending inwardly therefrom, a pitch control rod slidably mounted within said rotor assembly support member coaxially thereof, a lever on said load support connected witht he lower end of said pitch control rod for adjusting the rod in a vertical direction, and means connecting said rod with the inner ends of said torsion tubes for simultaneously applying torsional forces thereto.

3. In a helicopter, a load support having a mast, a pilot cage secured to the lower end of said mast, stabilizing fins secured to an intermediate portion of said mast and extending away from said pilot cage, the upper end of said mast being curved over said pilot cage, a rotor assembly support member rotatably supported at the upper end of said mast for rotation on a vertical axis, the upper end of said support member being clevis-shaped, a tension-torsion bar of generally tubular shape pivoted in said clevis for teetering on a horizontal axis, a pair of hollow airfoil-shaped rotor blades fixed to the outer ends of said tension-torsion bar and extending outwardly therefrom, gas turbine means centrally supported above said tension-torsion bar, a pair of ducts leading from the outlet of said gas turbine means in opposite directions, portions of said ducts surrounding said tension-torsion bar, transition ducts connecting the outer ends of said first-mentioned ducts with the inner ends of said hollow rotor blades, a pair of sliding seals between said first-mentioned ducts and said transition ducts, said seals permitting free rotation of said transistion ducts with respect to said first-mentioned ducts but preventing leakage of combustion gases from said ducts, and means carried by said load support and connected to the outer ends of said tension-torsion bars for twisting said outer ends to collectively change the pitch of said rotor blades.

4. The combination according to claim 3, each of said seals comprising an annular projecting sealing ring gripping one of said ducts, a ring of U-shaped cross section enclosing said sealing ring, and an annular flexible bellows secured between said ring and the adjacent duct.

5. The combination according to claim 3, further provided wtih a pair of muffs between said transition ducts and said rotor blades, and a plurality of radial vanes each secured along one edge to an outer end of said tension-torsion bar and along the opposite edge to the adjacent muff, whereby the centrifugal forces on said rotor blades will be transmitted through said vanes to said tension-torsion bar.

6. In a helicopter, a load support, a rotor assembly support member rotatably mounted on said load support for rotation on a single axis, a rotor assembly pivotally mounted on said support member on an axis transverse to the rotor assembly support member axis and having rotor blades, a gas turbine mounted on said rotor assembly coaxially with said support member, duct means connecting the outlet of said turbine with the tips of said rotor blades, conduits adapted to emit combustion gases tangentially from the blade tips, means for supplying fuel to said gas turbine, a fuel control unit in said supply means, and means in said control unit responsive to an increase in the rotational speed of said rotor assembly for lessening the amount of fuel permitted to flow to said gas turbine.

7. The combination according to claim 6, said fuel control unit comprising a valve in said fuel conduit, said valve being movable to restrict the fuel flow in varying degrees, a weight connected to said valve and movable in one direction in response to an increase in rotor blade rotational speed to further restrict the fuel flow, and a spring acting against said weight to increase fuel flow upon a decrease in rotor blade speed.

8. In a helicopter, a rotor assembly comprising a plurality of rotor blades, a gas turbine mounted at the center of said rotor assembly, a load support rotatably connected to said rotor assembly coaxially with said gas turbine and suspended therebelow, means for conducting gases from said turbine to the tips of said rotor blades for emission in a tangential direction, means for supplying fuel to said gas turbine, a fuel control unit mounted on said turbine housing, said unit having a valve interposed in said fuel supply means, a weight responsive to increases in the rotational speed of said rotor assembly for moving said valve in a direction to reduce fuel flow to said gas turbine, a lubricating oil pump driven by said turbine, means connecting the outlet of said pump to said fuel control unit, and means within said fuel control unit responsive to the attainment of a predetermined pressure by said lubricating oil for moving said valve in a direction to reduce the flow of fuel to said turbine.

9. In a helicopter, a rotor assembly having a plurality of blades, a load support rotatably connected to said rotor assembly and suspended therebelow, a gas turbine carried by said rotor assembly coaxially with said load support connection, means for conducting combustion gases from said turbine to the tips of said rotor blades for emission in a tangential direction, a central shaft in said turbine, a bearing for said shaft, a lubricating oil pump driven by said turbine, a compressor in said turbine, a combustion chamber for receiving compressed air from said compressor, a plurality of diffuser vanes disposed between said compressor and said combustion chamber, an internal passageway in one of said diffuser vanes connected with said bearing, and a conduit connecting the outlet of said pump with said passageway.

10. The combination according to claim 9, further provided with a housing for said turbine, said housing having a bowl-shaped portion, a plurality of outlet ducts extending downwardly from the lower end of said housing and curving outwardly, said ducts being connected with said rotor blades, an annular lubricating oil reservoir below said bowl-shaped housing portion and surrounding the upper portions of said outlet ducts, and a conduit connecting said reservoir with the inlet of said pump.

11. In a helicopter, a rotor blade assembly comprising a plurality of diametrically opposed rotor blades, a load support rotatably connected to said rotor assembly and suspended therebelow, a gas turbine on said rotor assembly and coaxial with said rotatable connection, a hollow tension-torsion bar connecting said rotor blades, a pair of outlet ducts leading from said gas turbine to said rotor blades, portions of said ducts surrounding intermediate portions of said tension-torsion bars, a compressor in said turbine, and a cooling air conduit leading from the outlet of said compressor to the interior of said tension-torsion bar intermediate portions.

12. The combination according to claim 11, further provided with a plurality of tubular supports mounted on said tension-torsion bar and supporting said gas turbine, said cooling air conduit comprising at least one of said tubular supports.

13. In a helicopter, a rotor blade assembly comprising a plurality of rotor blades, a load support for rotation on a single axis, a bearing housing carried by said load support, a rotor assembly support member rotatably mounted in said bearing housing, a teetering pin supported by said rotor assembly support member an on axis transverse to the rotor assembly support member axis, said rotor assembly being pivotally mounted on said teetering pin, a gas turbine mounted on said rotor assembly, means connecting the outlet of said gas turbine to the tips of said rotor blades for emitting combustion gases tangentially therefrom, a pitch control rod slidably mounted coaxially within said rotor assembly support member, a pitch adjusting lever carried by said load support, a connecting member rotatably secured to the lower end of said pitch control rod, linkage means connecting said lever and connecting member whereby said rod may be axially adjusted by said lever, and means connecting the upper end of said rod to said rotor blades for collectively changing the blade pitch upon adjustment of said rod.

14. The combination according to claim 13, further provided with a fuel tank on said load support, a conduit leading from said fuel tank to said connecting member, passageway means within said connecting member and said control rod leading to the upper end of said rod, and a conduit connecting the upper end of said rod to said gas turbine.

15. The combination according to claim 13, the means connecting said control rod and said rotor blades comprising a gimbal, and arms connecting said rotor blades and said gimbal, whereby movement of said gimbal will simultaneously rock said arms.

16. In a helicopter, a rotor blade assembly comprising a tension-torsion bar of tubular shape having two spaced intermediate portions adapted to be torsionally deflected, a gas turbine supported above said tension-torsion bar, a pair of outlet ducts leading in opposite directions from said gas turbine and surrounding said tension-torsion bar, a pair of rotor blades secured to the outer ends of said tension-torsion bar and having rotatable seal connections with said outlet ducts, means for emitting combustion gases tangentially from the tips of said blades, a rotor blade assembly support member having a teetering pin at its upper end, the central portion of said tension-torsion bar being mounted on said pin, a load support having a mast, a bearing housing at the upper end of said mast, said rotor assembly support member being rotatably mounted in said bearing housing, a pitch control lever on said load support, a pitch control rod coaxially mounted for sliding and rotative movement within said rotor assembly support member, linkage means connecting said lever with said rod whereby the rod may be axially adjusted, a gimbal mounted at the upper end of said rod, a pair of torsion tubes surrounding said tension-torsion bars, said tubes being secured to the outer ends of said bars and extending inwardly therefrom, and a pair of arms secured to the inner ends of said tubes, said arms being connected with said gimbal whereby movement of said gimbal will cause simultaneous rocking of said arms.

17. In a helicopter, a rotor blade assembly having a plurality of rotor blades, a pair of gas turbines centrally mounted on opposite sides of said assembly so as to rotate therewith, ducts leading from said turbines to the tips of said rotor blades, means for emitting combustion gases tangentially from said tips, a load support rotatably connected to said rotor blade assembly and suspended therebelow, a fuel supply tank on said load support, and conduit means leading from said fuel supply tank to said turbines.

18. The combination according to claim 17, the axes of said gas turbines being slightly inclined away from each other in an upward direction.

19. In a helicopter, a load support, a rotor assembly support member rotatably mounted on said load support, a rotor assembly mounted on said support member and having rotor blades, a gas turbine mounted on said rotor assembly coaxially with said support member, duct means connecting the outlet of said turbine with the tips of said rotor blades, conduits adapted to emit combustion gases tangentially from the blade tips, means for supplying fuel to said gas turbine, a fuel control unit in said supply means, means in said control unit responsive to an increase in the rotational speed of said rotor assembly for lessening the amount of fuel permitted to flow to said gas turbine, an oil pump driven by the rotor of said gas turbine, and means in said fuel control unit responsive to a predetermined oil pressure created by said pump for reducing the flow of fuel to said turbine.

20. In a helicopter, a rotor blade assembly comprising a plurality of rotor blades, a load support, a bearing housing carried by said load support, a rotor assembly support member rotatably mounted in said bearing housing, a teetering pin supported by said rotor assembly support member, said rotor assembly being pivotally mounted on said teetering pin, a gas turbine mounted on said rotor assembly, means connecting the outlet of said gas turbine to the tips of said rotor blades for emitting combustion gases tangentially therefrom, a pitch control rod slidably mounted coaxially within said rotor assembly support member, a pitch adjusting lever carried by said load support, a connecting member rotatably secured to the lower end of said pitch control rod, linkage means connecting said lever and connecting member whereby said rod may be axially adjusted by said lever, means connecting the upper end of said rod to said rotor blades for collectively changing the blade pitch upon adjustment of said rod, a fuel tank on said load support, conduit means connecting said fuel tank with said gas turbine, an air pressure tap from said gas turbine, a conduit connecting said air pressure tap with said rotor assembly support member, passageway means within said rotor assembly support member and said bearing housing for leading pressurized air to the outside of said bearing housing, and a conduit leading from said passageway means to the upper portion of said fuel tank, whereby fuel will be forced by air pressure to said turbine.

21. In a helicopter, a rotor blade assembly comprising a tension-torsion bar of tubular shape having two spaced intermediate portions adapted to be torsionally deflected, the cross-sectional configuration of the flexible portions of said tension-torsion bar comprising a plurality of radially arranged spaced stringers, a gas turbine supported above said tension-torsion bar, a pair of outlet ducts leading in opposite directions from said gas turbine and surrounding said tension-torsion bar, a pair of rotor blades secured to the outer ends of said tension-torsion bar and having rotatable seal connections with said outlet ducts, means for emitting combustion gases tangentially from the tips of said blades, a rotor blade assembly support member having a teetering pin at its upper end, the central portion of said tension-torsion bar being mounted on said pin, a load support having a mast, a bearing housing at the upper end of said mast, said rotor assembly support member being rotatably mounted in said bearing housing, a pitch control lever on said load support, a pitch control rod coaxially mounted for sliding and rotative movement within said rotor assembly support member, linkage means connecting said lever with said rod whereby the rod may be axially adjusted, a gimbal mounted at the upper end of said rod, a pair of torsion tubes surrounding said tension-torsion bars, said tubes being secured to the outer ends of said bars and extending inwardly therefrom, and a pair of arms secured to the inner ends of said tubes, said arms being connected with said gimbal whereby movement of said gimbal will cause simultaneous rocking of said arms, a cooling air connection between said gas turbine and the interior of said tension-torsion bar, and apertures in the outer ends of said torsion tubes for permitting said cooling air to intermix with the combustion gases.

22. In a helicopter, a rotor blade assembly comprising a tension-torsion bar of tubular shape having two spaced intermediate portions adapted to be torsionally deflected, the cross-sectional configuration of said flexible portions of the tension-torsion bar comprising a plurality of flat horizontal plates in overlapping relation, the inner ends of said plates being secured to a tubular central portion of said tension-torsion bar, a gas turbine supported above said tension-torsion bar, a pair of outlet ducts leading in opposite directions from said gas turbine and surrounding said tension-torsion bar, a pair of rotor blades secured to the outer ends of said tension-torsion bar and having rotatable seal connections with said outlet ducts, means for emitting combustion gases tangentially from the tips of said blades, a rotor blade assembly support member having a teetering pin at its upper end, the central portion of said tension-torsion bar being mounted on said pin, a load support having a mast, a bearing housing at the upper end of said mast, said rotor assembly support member being rotatably mounted in said bearing housing, a pitch control lever on said load support, a pitch control rod coaxially mounted for sliding and rotative movement within said rotor assembly support member, linkage means connecting said lever with said rod whereby the rod may be axially adjusted, a gimbal mounted at the upper end of said rod, a pair of torsion tubes surrounding said tension-torsion bars, said tubes being secured to the outer ends of said bars and extending inwardly therefrom, a pair of arms secured to the inner ends of said tubes, said arms being connected with said gimbal whereby movement of said gimbal will cause simultaneous rocking of said arms, and a pair of droop stops secured to said central portion and extending outwardly therefrom, said stops being adapted to be engaged by the upper interior surfaces of said torsion tubes when the rotor blades droop a predetermined amount.

23. In a helicopter, a rotor blade assembly having a plurality of rotor blades, gas turbine means centrally mounted on said assembly so as to rotate therewith, duct means leading from said gas turbine means to the tips of said rotor blades, means for emitting combustion gases tangentially from said tips, a load support, a rotor hub carried by said load support for rotation on a rotor axis fixed with respect to said load support, and a bar pivoted to said hub on an axis transverse to the rotor axis and supporting said rotor blades and gas turbine means.

24. The combination according to claim 23, further provided with a fuel supply tank on said load support, and conduit means leading from said fuel supply tank through said hub to said turbine means.

25. The combination according to claim 23, the means for supporting said gas turbine means comprising a plurality of support tubes secured at their lower ends to said bar and at their upper ends to said gas turbine means.

26. The combination according to claim 25, further provided with means for conducting combustion air for said gas turbine means through one of said tubes.

27. The combination according to claim 23, said gas turbine means being supported above said bar, said rotor blades being secured to the outer ends of said bar, and duct means leading downwardly and outwardly from said gas turbine means to said rotor blades and surrounding said bar.

References Cited in the file of this patent

UNITED STATES PATENTS

| | | |
|---|---|---|
| 2,553,193 | Hodson et al. | May 15, 1951 |
| 2,631,676 | Hiller | Mar. 17, 1953 |
| 2,654,995 | Ostroff | Oct. 13, 1953 |
| 2,689,011 | Zakhartchenko | Sept. 14, 1954 |
| 2,757,745 | Verhage | Aug. 7, 1956 |
| 2,814,349 | Berry | Nov. 26, 1957 |
| 2,831,543 | Matthews | Apr. 22, 1958 |

FOREIGN PATENTS

| | | |
|---|---|---|
| 760,050 | Great Britain | Aug. 29, 1956 |
| 1,095,157 | France | Dec. 15, 1954 |

UNITED STATES PATENT OFFICE
CERTIFICATE OF CORRECTION

Patent No. 3,052,305　　　　　　　　　　　　　　　September 4, 1962

John F. Jones et al.

It is hereby certified that error appears in the above numbered patent requiring correction and that the said Letters Patent should read as corrected below.

Column 8, line 39, for "coniderations" read -- considerations --; line 49, for "weigh" read -- weight --; column 11, line 55, strike out "and", second occurrence; column 13, lines 34 and 35, strike out "for rotation on a single axis", and insert the same after "housing" in line 37, same column 13; column 16, line 46, for "Mar. 17, 1953" read -- Mar. 17, 1933 --; line 54, for "760,050" read -- 756,050 --.

Signed and sealed this 1st day of January 1963.

(SEAL)
Attest:

ERNEST W. SWIDER
Attesting Officer

DAVID L. LADD
Commissioner of Patents